US010851910B2

(12) United States Patent
Cooley et al.

(10) Patent No.: US 10,851,910 B2
(45) Date of Patent: Dec. 1, 2020

(54) FULLY-INTEGRATED, TOP-FILL, PRESSURELESS FLOW-CONTROL MODULE COUPLABLE TO A PULSATING PRESSURIZED FUEL SOURCE

(71) Applicants: Robert Charles Cooley, Springville, UT (US); Dean Edward Mackey, Springville, UT (US)

(72) Inventors: Robert Charles Cooley, Springville, UT (US); Dean Edward Mackey, Springville, UT (US)

(*) Notice: Subject to any disclaimer, the term of this patent is extended or adjusted under 35 U.S.C. 154(b) by 119 days.

(21) Appl. No.: 16/087,662

(22) PCT Filed: Mar. 23, 2017

(86) PCT No.: PCT/US2017/023921
§ 371 (c)(1),
(2) Date: Sep. 23, 2018

(87) PCT Pub. No.: WO2017/165719
PCT Pub. Date: Sep. 28, 2017

(65) Prior Publication Data
US 2019/0113150 A1 Apr. 18, 2019

Related U.S. Application Data

(60) Provisional application No. 62/312,313, filed on Mar. 23, 2016.

(51) Int. Cl.
*F16K 31/34* (2006.01)
*F16K 31/18* (2006.01)
(Continued)

(52) U.S. Cl.
CPC .............. *F16K 31/28* (2013.01); *B60K 15/04* (2013.01); *B60K 15/077* (2013.01); *F16K 31/34* (2013.01);
(Continued)

(58) Field of Classification Search
CPC ....... F16K 21/18; F16K 21/185; F16K 24/042; F16K 24/044; F16K 24/048; F16K 31/24;
(Continued)

(56) References Cited

U.S. PATENT DOCUMENTS

2015/0227144 A1* 8/2015 Cooley .................. F16K 31/34
137/413

FOREIGN PATENT DOCUMENTS

GB            1567472 A  *  5/1980  ............. B67D 7/367

* cited by examiner

*Primary Examiner* — Hailey K. Do
(74) *Attorney, Agent, or Firm* — Angus C. Fox, III

(57) ABSTRACT

A fully-integrated, flow-control module for top-fill fuel tanks operates with a fuel line attached that supplies fuel under pulsating pressure. There are two bleed paths in the module, which open and close sequentially in response to the position of a fuel float within the module. In order for a main valve plunger, which controls fuel entry into the tank, to fully close, both bleed paths must be closed. A first bleed path closes first, followed by closure of the second. For the main valve plunger to fully open, both bleed paths must be open. The second bleed path opens first. Movement of the main valve plunger is controlled by both a biasing spring and pressure beneath the plunger. Pressure beneath the plunger builds up to a level sufficient for the biasing spring to fully close the plunger against a valve seat when both bleed paths are closed.

10 Claims, 16 Drawing Sheets

(51) Int. Cl.
- *F16K 31/28* (2006.01)
- *B60K 15/077* (2006.01)
- *G05D 9/02* (2006.01)
- *B60K 15/04* (2006.01)
- *B60K 15/03* (2006.01)

(52) U.S. Cl.
CPC ...... *G05D 9/02* (2013.01); *B60K 2015/03289* (2013.01); *B60K 2015/03335* (2013.01); *B60K 2015/03368* (2013.01); *F16K 31/18* (2013.01); *Y10T 137/7365* (2015.04); *Y10T 137/7384* (2015.04); *Y10T 137/7433* (2015.04)

(58) Field of Classification Search
CPC ........ F16K 31/26; F16K 31/34; F16K 31/122; F16K 31/1223; F16K 31/1226; F16K 33/00; Y10T 137/2675; Y10T 137/2965; Y10T 137/2968; Y10T 137/7365; Y10T 137/7368; Y10T 137/7371; Y10T 137/7381; Y10T 137/7384; Y10T 137/7387; Y10T 137/7423; Y10T 137/7426; Y10T 137/7433; G05D 9/00; G05D 9/04; B60K 15/01; B60K 2015/03026; B60K 2015/03289; B60K 2015/03519

See application file for complete search history.

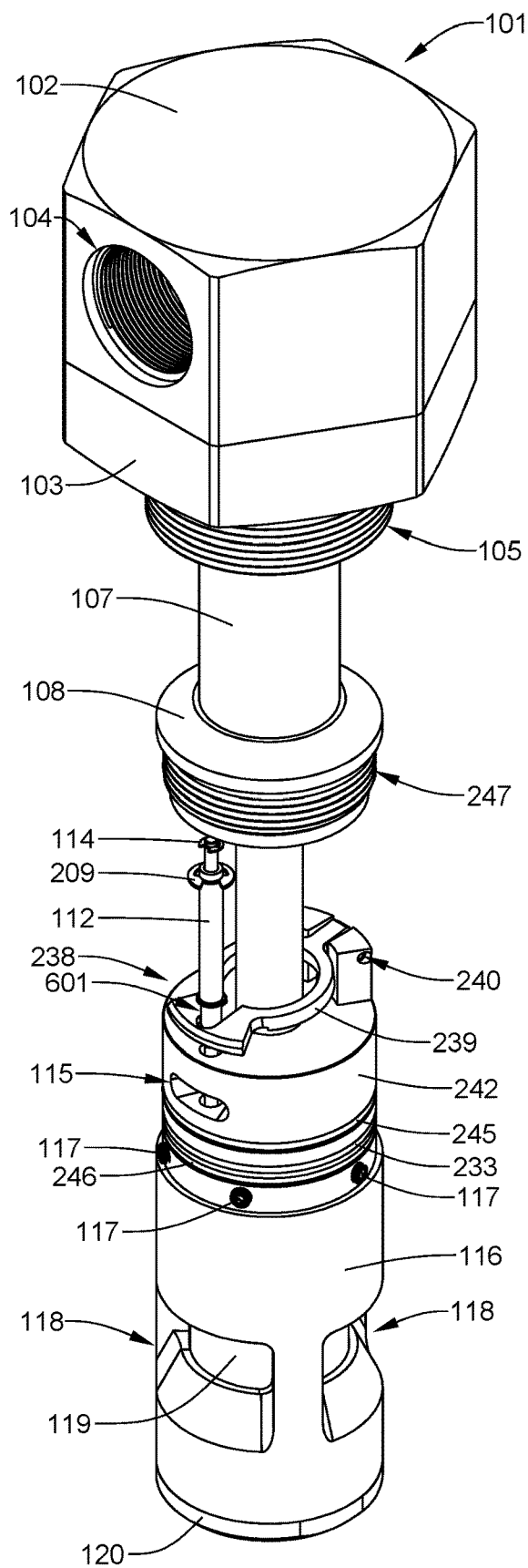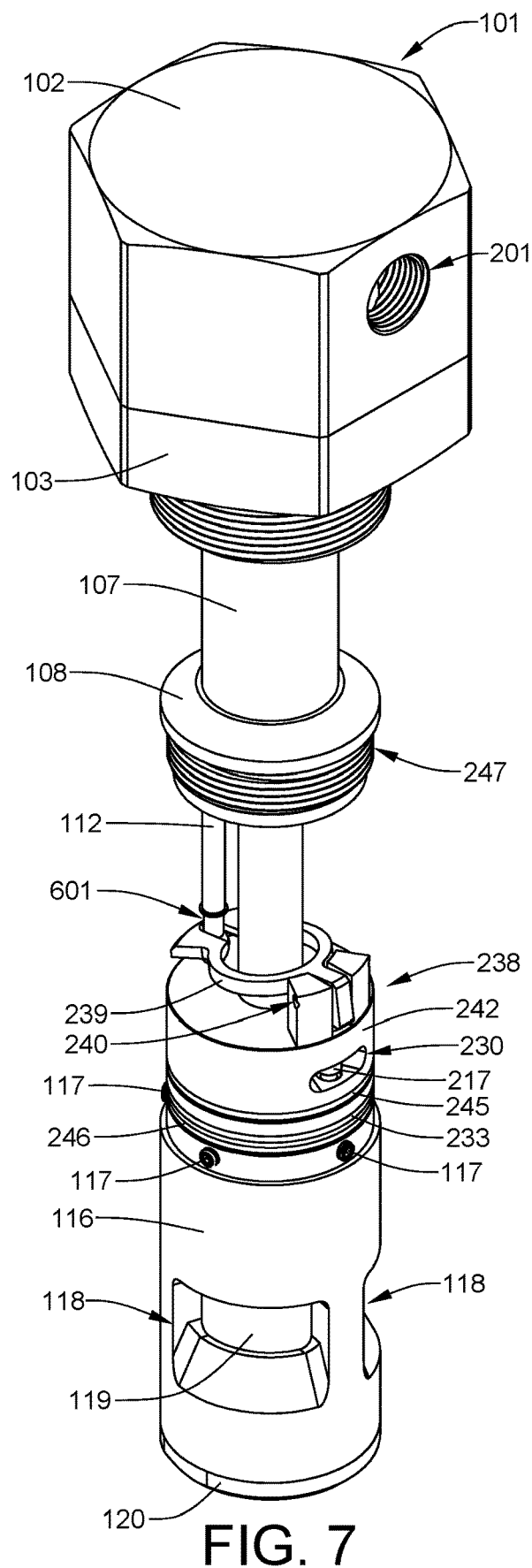

FULLY-INTEGRATED, TOP-FILL, PRESSURELESS FLOW-CONTROL MODULE COUPLABLE TO A PULSATING PRESSURIZED FUEL SOURCE

FIELD OF THE INVENTION

This invention relates, generally, to valve assemblies and, more particularly, to flow control valve assemblies that are used to protect primarily fuel tanks from being overfilled with fuel. However, it is likely that such flow control valve assemblies may be used to protect other types of containers, other than fuel tanks, from being overfilled with other kinds of fluids.

BACKGROUND OF THE INVENTION

For many years large machinery fitted with fuel tanks have been equipped with rapid-fill fueling systems to enable rapid filing of large capacity fuel tanks. The existing fast fill fuel systems rely on an air vent that prevents air from escaping the fuel tank when the required level of fuel has been attained. This causes pressure in the fuel tank to increase to a level that automatic shuts-off a fuel supply nozzle.

A major concern of this system is that when the fuel level activates the shut-off for the fuel supply nozzle, the shut-off can be overridden and fuel can continue to be forced into the fuel tank above the normal level. This can cause the fuel tank to rupture from the high pressure attained when filling.

U.S. Pat. No. 6,311,723, (by the applicant), has addressed this problem by devising a flow control valve assembly that prevents the build up of pressure within the fuel tank during and after filing. The flow control valve assembly also prevents the supply fuel nozzle from being overridden thus preventing the possibility of overfilling. U.S. Pat. No. 6,311,723 is hereby incorporated by reference.

The control valve assembly of U.S. Pat. No. 6,311,723 uses float valve to determine when the level of fuel in the fuel tank is at a desired level. When the desired level of fuel has been attained, the float valve is used to block the flow of fuel through a bleed pipe to stop the flow of fuel through a control valve. An open breather is provided within the fuel tank to allow gas to escape from the fuel tank during filling to prevent the fuel tank rupturing.

Another problem associated with prior-art flow control valves is that they are typically used in bottom-filled tanks. This requires that the float assembly be located inside the tank near the top thereof, while the flow control valve is located near the bottom of the tank near where the fuel nozzle couples to the receiver. In order for the float assembly to control the flow control valve, a small-diameter bleed line is used to couple the flow control valve assembly—that is near the bottom of the tank—to the float assembly that is near the top of the tank. The bleed line can be routed either internal or external to the tank, depending on the design of the unit. The use of such a two-piece assembly precludes the use of such a device in smaller tanks.

What was needed is a fully-integrated flow control assembly that mounts at the top of the fuel tank. In such a fully-integrated unit, the float assembly and the flow control valve assembly are both installed within the tank near the top thereof only an inlet/vent head protrudes from the top of the tank. Installing the fully-integrated assembly is much simpler than installing the separate float and control valve assemblies, as there is no need to make a connection between the two devices.

The aforementioned problems were solved, as evidenced by the filing of PCT patent application No. PCT/US2013/000223 titled FULLY-INTEGRATED FLOW-CONTROL VALVE ASSEMBLY FOR TOP-FILLED FUEL TANKS, by the same inventor, on 24 Sep. 2013. This flow-control valve, which is designed for internal mounting near the top of a fuel tank, is suitable for use with liquids, such as petroleum fuels, that do not freeze.

To date, pressureless flow-control modules, whether they be of the top-fill or bottom-fill variety, are not designed to be permanently coupled to a pressurized fuel fill line. Typically, a nozzle is quick-coupled to a flow-control valve assembly on a fuel tank that is at least partly empty. During a filling operation, the fuel level reaches a preset full level and the flow-control valve shuts off, causing the nozzle to also shut off. The nozzle is then removed from the flow-control valve assembly, and not reattached until the tank requires refilling. A need has arisen for a flow-control module used on fuel tanks that are mounted on equipment that is operated continuously. Such equipment is powered by a powerful (i.e., 200+ horsepower) diesel engine which is fitted with a small fuel supply tank and connected to a larger reservoir tank to allow for continuous operation. Existing flow-control modules are designed such that they will not open to admit the entry of additional fuel if fuel pressure is maintained on the flow-control module inlet following module shut-off, even if the fuel level in the tank drops below the designed module shut-off level. In order for fuel to reenter the inlet, pressure would, first, need to be cut to zero. This would be impractical, as it is preferable and simpler to maintain constant pressure in the fuel feed lines to the tanks of multiple power units.

In recognition of the lack of a flow-control module designed to admit entry of fuel through a pressurized line when fuel level in a tank drops, a PCT patent application No. PCT/US2017/017742 titled FULLY-INTEGRATED, TOP-FILL, PRESSURELESS FLOW-CONTROL MODULE COUPLABLE TO A PRESSURIZED FUEL LINE, by the same inventor, was filed on 13 Feb. 2017. This flow-control module is capable of turning on and off when fed with a fuel line supplied with fuel under relatively constant pressure. However, pressurization of fuel feed lines is frequently maintained by a pump having an output with pulsating pressure. Pulsating fluid pressure at the inlet port can prevent the valve from ever shutting off completely, even when the tank is fuel.

What is needed is a fully-integrated, flow-control valve assembly for top-fill tanks that will not only switch between on and off states even when the fuel inlet is supplied with fuel under pressure, but will also remain in an OFF state when the tank is full, even when subjected to pulsating inlet fluid pressure.

SUMMARY OF THE INVENTION

The fully-integrated, flow-control module for top-fill fuel tanks of the present invention is designed to operate properly with a fuel line attached to the inlet port that supplies fuel under pulsating pressure. A main control valve within the flow-control module closes automatically when the tank is full, and automatically opens when the fuel level drops a certain amount below the full level. The flow-control module has a two-piece inlet/vent head that is connected to a multi-component control valve unit via a vertical connector pipe. The control valve unit has an externally threaded top cap. The top cap also has an internally threaded cylindrical socket that screws onto the connector pipe. The bottom of the top cap has an unthreaded cylindrical socket that is coaxial with the internally threaded cylindrical socket and that receives a top end of a hollow cylindrical central float guide. A fuel level float slides up and down on the central float guide, which it surrounds. A sleeve, having both a cylindrical inner bore that is parallel to the float guide axis and a lever-lifting flange at a bottom end thereof, is secured within the fuel level float. A cylindrical rod, having a secondary bleed port valve plug at a bottom end thereof, is slidably installed within the cylindrical inner bore of the sleeve. A bleed path control assembly incorporates a lever arm, a first end of which is coupled to the sleeve, with the end thereof operative on a vertically-slidable control pin, which slides within a cylindrical control pin bore in the bleed path control assembly. The bleed path control assembly also has a bleed pin bore that is below and concentric with the control pin bore. A generally cylindrical, upwardly-biased bleed pin, that has a central bore, slides within the bleed pin bore. When the control pin is depressed by the lever arm, a resilient rubber seal on the bottom end of the control pin seals the aperture of the bleed pin, thereby cutting off that primary bleed path route. When the fuel level float is at the upper limit of its travel, it has lifted the cylindrical rod an amount sufficient for the secondary bleed port valve plug to seal the escape port of the secondary bleed path. A cylindrical float cage having an internally threaded upper end, slides over the bleed path control assembly, over the float, and screws onto the external threaded of the top cap. A bleed pin spring retainer, which retains a bleed pin coil spring that upwardly biases the bleed pin, also slides into the bottom end of the float cage and is secured therein with five set screws. The bleed pin spring retainer also incorporates an upper vertical bleed by passage that is coupled to the chamber in which the bleed pin coil spring is retained via a circular gap between the bottom of the bleed path control assembly and the top of the bleed pin spring retainer. A bottom end of the spring retainer plug is externally threaded, and is threadably coupled to a main valve control unit that incorporates a valve seat, a cylindrical bore for a slidable main valve plunger that can engage the valve seat to cut off flow through the flow-control module, and a lower vertical fuel bleed by passage that is coupled to the upper bleed by passage via a circular groove in the bleed pin spring retainer. The slidable main valve plunger, having a small central bleed aperture, is inserted into the cylindrical bore followed by a coil biasing spring. A bottom plug retains the biasing spring and the main valve plunger in the cylindrical main valve bore.

As heretofore explained, there are two bleed paths in the flow-control module. When fuel is flowing into the inlet port under pressure, passing through the connector pipe into the float guide, through the bleed path control assembly, past the valve seat, and escaping into the fuel tank, the main valve plunger remains in a lowered position as long as the bleed path, that begins with the bleed aperture in the main valve plunger, remains open and fuel can pass through either the primary bleed path or secondary bleed path and spill into the fuel tank. In order for the main valve plunger to close, both the primary and the secondary bleed paths—also referred to as the first and second bleed paths, respectively—must be closed. When both bleed paths are closed, sufficient pressure builds beneath the main valve plunger so that the biasing spring plus the added fuel pressure in the chamber below the main valve plunger together have sufficient force to lift the main valve plunger so that it engages the valve seat, thereby cutting off the entry of fuel into the fuel tank. Likewise, both bleed paths must be open for the valve plug to drop and unseal the valve seat.

BRIEF DESCRIPTION OF THE DRAWINGS

FIG. 6 is a first isometric view of the fully-integrated fluid flow control module for top-fill tanks in a valve-open configuration, with the float and float cage removed to show details of the control linkage that controls fluid flow through the bleed path;

FIG. 7 is a second isometric view of the fully-integrated fluid flow control module for top-fill tanks in a valve-open configuration, with the float and float cage removed to show details of the control linkage that controls fluid flow through the bleed path;

DETAILED DESCRIPTION OF THE INVENTION

The fully-integrated, flow-control module for top-fill fuel tanks of the present invention will now be described in detail with reference to the included drawing figures. It should be understood that although monochromatic line drawings do not lend themselves to a representation of a multi-component product in exact scale, a serious attempt has been made to portray the product in such a way that its structure and functionality are entirely comprehensible.

Figure 1:
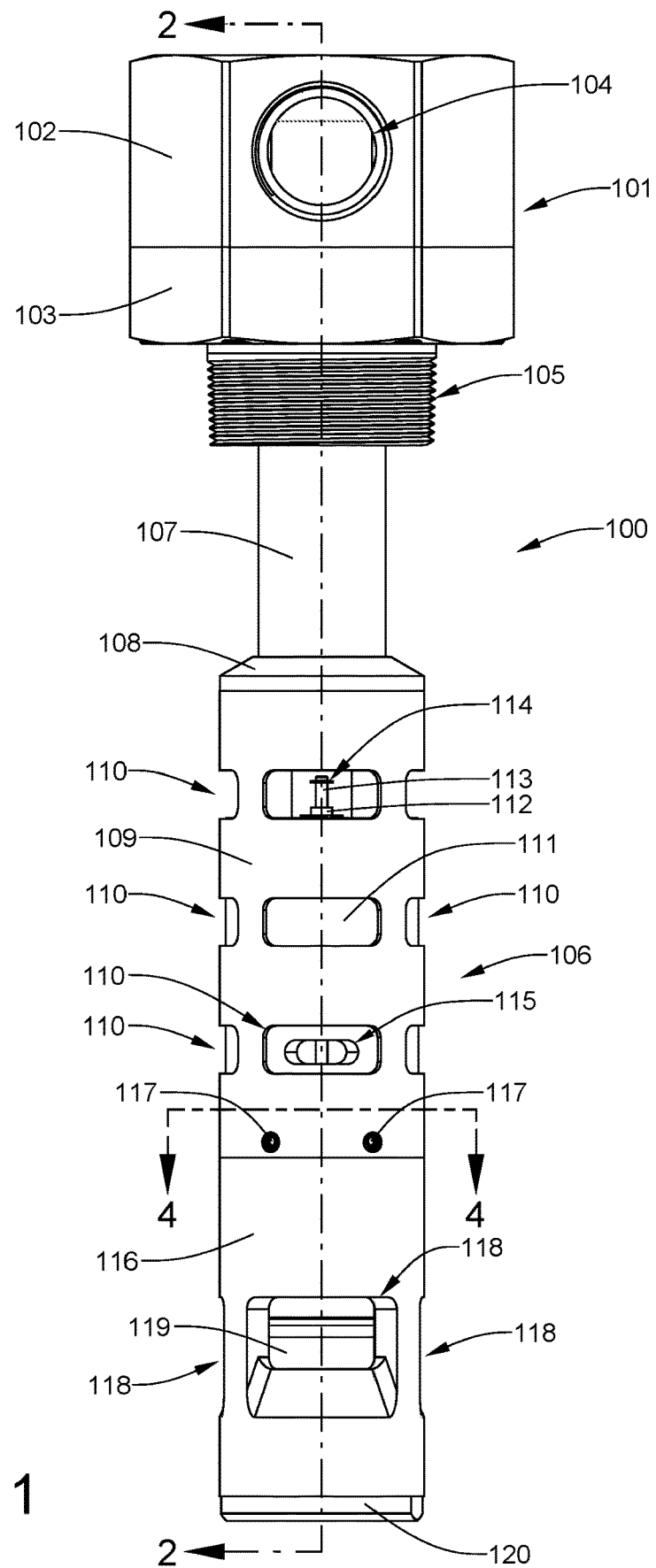
FIG. 1 is an elevational view of the fully-integrated fluid flow control module for top-fill fuel tanks in a valve-open configuration, and taken from the fluid inlet side thereof.

Referring now to FIG. 1, the fully-integrated, flow-control module 100 is seen from the inlet side in an elevational view. Other than the neoprene rubber seals and steel springs, the unit is manufactured preferably from a durable alloy of stainless steel. A hexagonally-shaped inlet/vent head 101 includes an top portion 102 and a bottom portion 103 which are bolted together at the corners of the hexagon. An inlet port 104 in the upper portion 102 is visible in this view, as is a threaded neck 105 on the lower portion 103, which threadably engages an internally threaded port on the top of the fuel tank. The inlet/vent head 101 is threadably coupled to a control valve unit 106 via a connector pipe 107. In this assembled view of the flow-control module 100, primarily the outer components of the control valve unit 106 are visible. The connector pipe 107 screws into a top cap 108, which is threadably connected to a float cage 109 having a plurality of access ports 110 that allow fuel to flow back and forth between the interior of the fuel tank (not shown) and the interior of the control valve unit 106. A fuel level float 111 is vertically slidable within the float cage 109, and can seen through three of the access ports 110. A sleeve 112 is secured within the fuel level float 111. A generally cylindrical rod 113, having a snap ring 114 secured to a top end thereof, is slidable within the sleeve 112. A secondary bleed port 115 can be seen in one of the access ports 110. A main valve control unit 116 is coupled to the float cage 109. Five set screws 117, two of which are visible in this view, are part of the intercoupling mechanism between the float cage 109 and the main valve control unit 116. There are three fuel escape ports 118 in the main valve control unit 116. A slidable main valve plunger 119, which is partly visible through the fuel escape ports 118, is fully lowered to a main valve open position in this view. A bottom plug 120 traps the valve plunger 119 within the main valve control unit 116.

Figure 2:
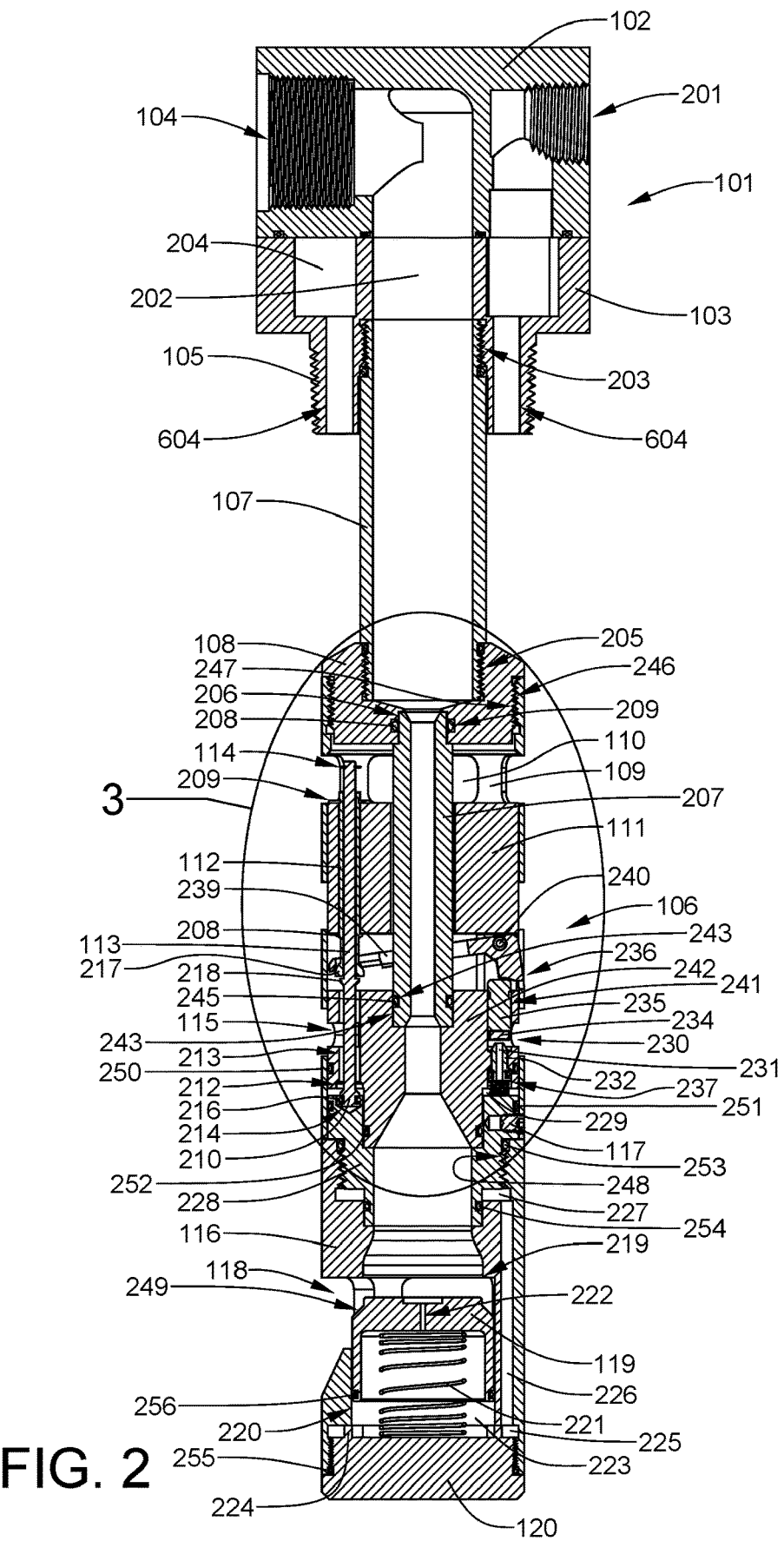
FIG. 2 is a cross-sectional view of the fully-integrated fluid flow control module for top-fill tanks, taken through section line 2-2 of FIG. 1.

Referring now to FIG. 2, this cross-sectional view of the flow-control module 100 shows the internal structure of both the inlet/vent head 101 and the control valve unit 106. Looking at the inlet/vent head 101, it can be seen that the inlet port 104 is on the left and that it is physically isolated from the vent port 201, which is on the right. Fuel flows from the inlet port 104 to a central chamber 202 of the inlet/vent head 101, said central chamber 202 being continuous between the upper and lower portions 102 and 103, respectively. A lower portion of the central chamber 202 of the bottom portion 103 is equipped with internal threads 203 that are threadably coupled to the top end of the connector pipe 107. The vent port 201 is in communication with an annular chamber 204 that surrounds the central chamber 202 and that communicates with the the fuel tank through six, equally-spaced cylindrical apertures (see item 604 of FIG. 6—and also of FIG. 2, which identify two such cylindrical apertures in each drawing figure) located within the threaded neck 105 of the bottom portion 103.

Figure 3:
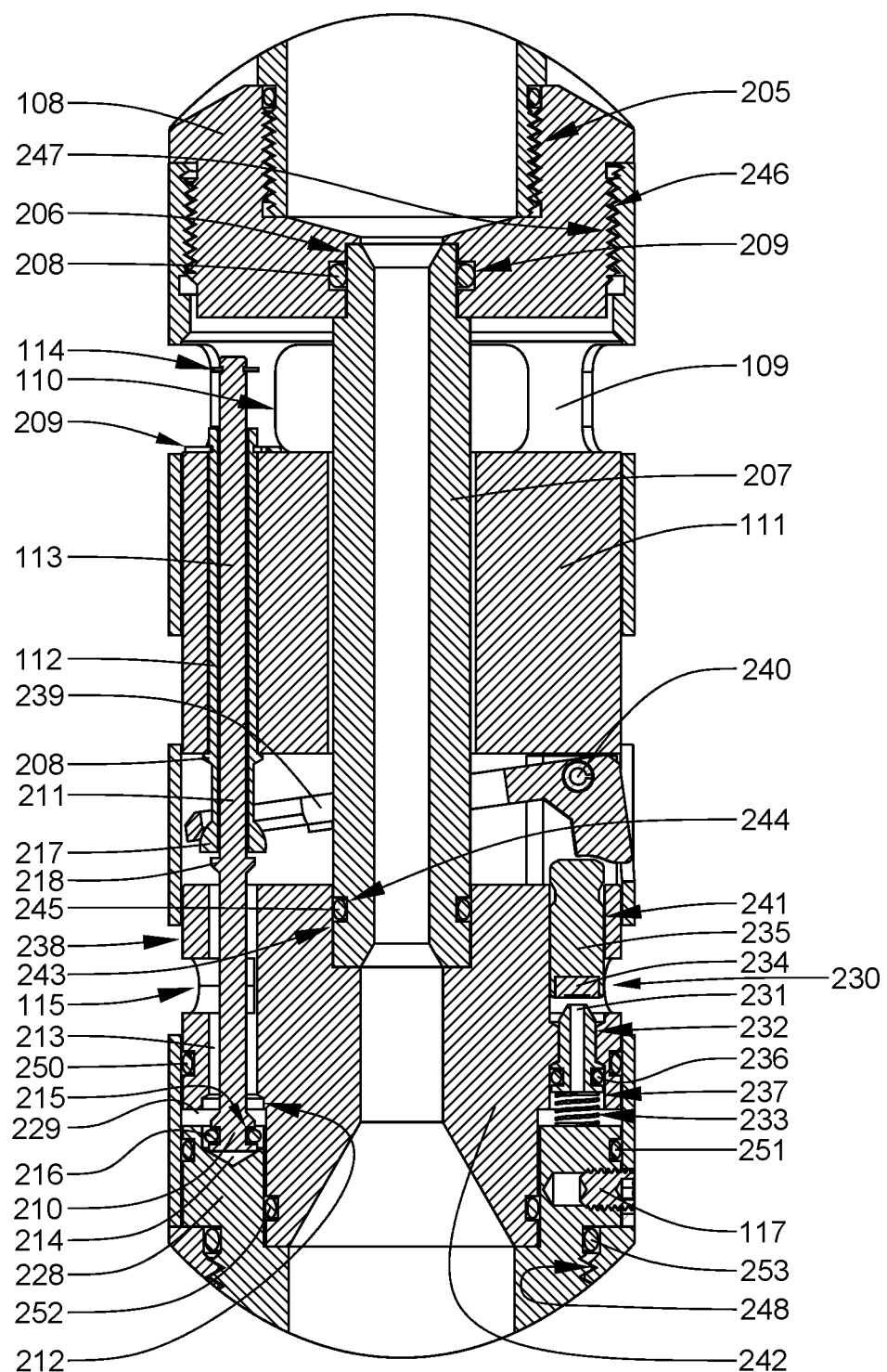
FIG. 3 is an enlarged view of the ellipsoid area 3 of FIG. 2, with 2× magnification.

Referring now to FIGS. 2 and 3, the bottom end of the connector pipe 107 screws into an internally-threaded socket 205 in the top cap 108 of the control valve unit 106. The top cap 108 also has a bottom recess 206 into which slides a generally cylindrical hollow float guide 207. A neoprene rubber O-ring seal 208 installed within an O-ring groove 209 in the bottom recess 206 prevents fuel leakage out of the bottom recess 206. The fuel level float 111, which surrounds the float guide 207, and which slides up and down on the float guide 207 in response to changing fuel levels in the fuel tank, has a sleeve 112 secured therein that is parallel to the float guide axis. The sleeve 112 is retained within the float 111 by an upper annular flange 208 and by a sleeve circlip 209. The generally cylindrical rod 113, which has a secondary bleed port valve plug 210 at a bottom end thereof, is slidably installed within an inner cylindrical bore 211 of the sleeve 112. The upper end of the cylindrical rod 113 is equipped with a rod circlip 114 that is caught by an upper end of the sleeve 112 when the fuel level float 111 rises within an upper portion of its upward range of motion, thereby lifting the cylindrical rod 113 and causing the valve plug 210 to seal the bottom opening 212 of a vertical secondary bleed channel 213 that leads to the secondary bleed port 115 that dumps bleed fuel into the fuel tank. It will be noted that the valve plug 210, which slides vertically within a valve plug well 214, is equipped with an O-ring groove 215 and a resilient rubber O-ring 216 that prevents fuel leakage into the vertical secondary channel 213 when the valve plug 210 has been lifted to close the bottom opening 212. It will also be noted that bottom end of the sleeve 112 is equipped with a lower annular flange 217, and that there is a substantial gap between the upper annular flange 208 and the lower annular flange 217 of the sleeve 112. It will be further noted that the cylindrical rod 113 is equipped with a central annular flange 218. When the fuel level float 111 drops, the lower annular flange 217 at the bottom end of the sleeve 112 contacts the central annular flange 218 of the cylindrical rod 113, causing the cylindrical rod 113 to also drop.

Figure 4:
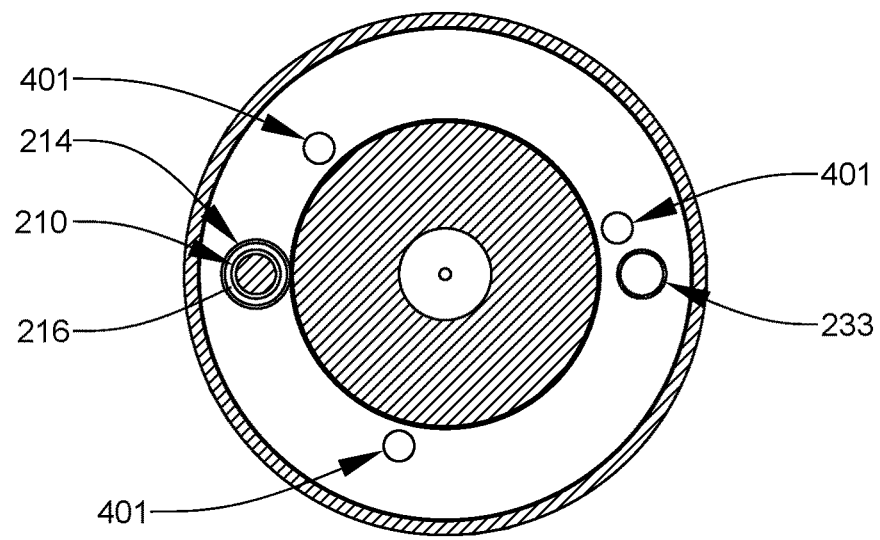
FIG. 4 is a cross-sectional view of the fully-integrated fluid flow control module for top-fill tanks, taken through section line 4-4 of FIG. 1.

Referring now to FIGS. 2, 3 and 4, a main fuel bleed path branches into primary and secondary bleed paths, each of which can be open or closed. The open and closed states of the primary and secondary bleed paths determine whether the main valve plunger 119 is closed against a valve seat 219, or is open. The main valve plunger 119 is slidable within a vertically-oriented cylindrical main valve bore 220, and is upwardly biased by a main coil biasing spring 221. The main bleed path begins with a small central bleed aperture 222 in the main valve plunger 119. Once inside the spring chamber 223 beneath the main valve plunger 119, where the main coil biasing spring 221 is located, bleed fuel flows through a castellated wall 224 in the bottom plug 116 and enters a lower annular chamber 225 that is adjacent the castellated wall 224. The lower annular chamber 225 is in communication with a lower vertical fuel bleed passage 226 in the main valve control unit 116 that is coupled to an intermediate annular chamber 227 between the main valve control unit 116 and a bleed pin spring retainer 228. The intermediate annular chamber 227 is in communication with an upper annular chamber 229 via three upper vertical fuel bleed passages 401, which can be seen in the cross-section view of FIG. 4, which is taken midway through the upper annular chamber 229. The primary and secondary bleed paths branch from the upper annular chamber 229. Bleed fuel within the upper annular chamber 229 can escape into the fuel tank though either a primary bleed port 230 or through the secondary bleed port 115. If the path through the central aperture 231 of a hollow bleed pin 232, that is upwardly biased by bleed pin spring 233, is not sealed by the resilient seal 234 on the bottom of a vertically-slidable bleed control pin 235, bleed fuel can escape into the fuel tank through primary bleed port 230. The hollow bleed pin 232 is equipped with an O-ring seal 236 to seal the gap between it and the bleed pin bore 237 in which it slides. In order for bleed fuel to escape through the secondary bleed port 115, the cylindrical rod 113 must be positioned low enough that the valve plug 210 does not block the bottom opening 212 of the vertical secondary channel 213.

Referring now to FIGS. 2 and 3, a bleed path control assembly 238 incorporates a lever arm 239 that pivots about a stationary axle 240, and is coupled to the fuel level float 111 via the sleeve 112, and is operative on the vertically-slidable bleed control pin 235, which slides within a cylindrical control pin bore 241 in the bleed path control assembly 238. The cylindrical control pin bore 241 is above and concentric with the bleed pin bore 237. It will be noted that the lever arm 239 is lifted by the lower annular flange 217 on the sleeve 112 and pushed down by the upper annular flange 208. The distance 601 (see FIGS. 6 and 7) between the lower annular flange 217 and the upper annular flange 208 provides hysteresis in the opening and closing of the bleed path through the hollow bleed pin 232, which prevents rapid fluctuation in the opening and closing of the main fuel valve, which comprises the main valve plunger 119 and the valve seat 219. There is also hysteresis in the movement of the cylindrical rod 113, as it is lifted when the top of the sleeve 112 contacts the rod circlip 114, and lowered when the lower annular flange 217 of the sleeve 112 contacts the central annular flange 218 on the cylindrical rod 113. In FIG. 3, it can be seen that the fuel level float 111 must rise a good distance before the top of the sleeve 112 contacts the rod circlip 114. The greater the hysteresis, the less the wear on the valve plunger 119 and the valve seat 219. The time between turn-on and turn-off of the main fuel valve is, of course, also dependent on the size of the fuel tank and the fuel consumption rate of the engine being fed by the fuel tank.

Still referring to FIGS. 2 and 3, it will also be noted that the main body 242 of the bleed path control assembly 238 has an upward-facing recess 243 that receives the lower end of the float guide 207. The lower end of the float guide 207 has an annular groove 244 and an O-ring seal 245 that prevent fuel leakage at the joint.

Still referring to FIGS. 2 and 3, the cylindrical float cage 109, having an internally threaded upper end 246, slides over the bleed path control assembly 238, over the fuel level float 111, and screws onto the external threads 247 of the top cap 108 of the control valve unit 106. The bleed pin spring retainer 228, which retains the bleed pin coil spring 233 that upwardly biases the hollow bleed pin 232, also slides into the bottom end of the float cage 109 and is secured therein with five set screws 117 (only one such set screw is seen in this view).

Referring now to FIGS. 2 and 4, a bottom end of the bleed pin spring retainer 228 is equipped with external threads 248 which are threadably coupled to the main valve control unit 112, which incorporates a valve seat 219 at the top of the vertically-oriented cylindrical main valve bore 220. When both the primary and the secondary bleed paths are blocked, the main valve plunger 119 rises and the plunger shoulder 249 seals against the valve seat 219, thereby cutting off the flow of fuel into the fuel tank. The main valve plunger 119 is inserted into the cylindrical main valve bore 220, followed by the main coil biasing spring 221. The bottom plug 116, which is threadably coupled to main valve control unit 112, retains the main biasing spring 221 and the main valve plunger 119 in the cylindrical main valve bore 220.

Referring now to FIG. 2, a number of additional O-ring seals are used in the flow-control module 100. An O-ring seal 250 is used to seal the joint between the float cage 109 and the main body 242 of the bleed path control assembly 238; an O-ring seal 251 is used to seal the joint between the float cage 109 and the bleed pin spring retainer 228; an O-ring seal 252 is used to seal the joint between the bleed pin spring retainer 228 and the main body 242 of the bleed path control assembly 238; O-ring seals 253 and 254 are used to seal joints between the bleed pin spring retainer 228 and the main valve control unit 112; and an O-ring seal 255 is used to seal the bottom plug 116 within the main valve control unit 112. It will also be noted that an O-ring seal 256 is employed to seal the gap between the main valve plunger 119 and the walls of the main valve bore 220.

Referring now to FIGS. 2 and 3, when fuel is flowing into the inlet port 104 under pressure, passing through the connector pipe 107 into the float guide 207, through the bleed path control assembly 238, past the valve seat 219, and escaping into the fuel tank, the main valve plunger 119 remains in a lowered position as long as the bleed path that begins with the central bleed aperture 222 in the main valve plunger 119 remains open and allows bleed fuel to pass through either the primary bleed port 230 into the fuel tank or through the secondary bleed port 115 into the fuel tank.

Figure 5:
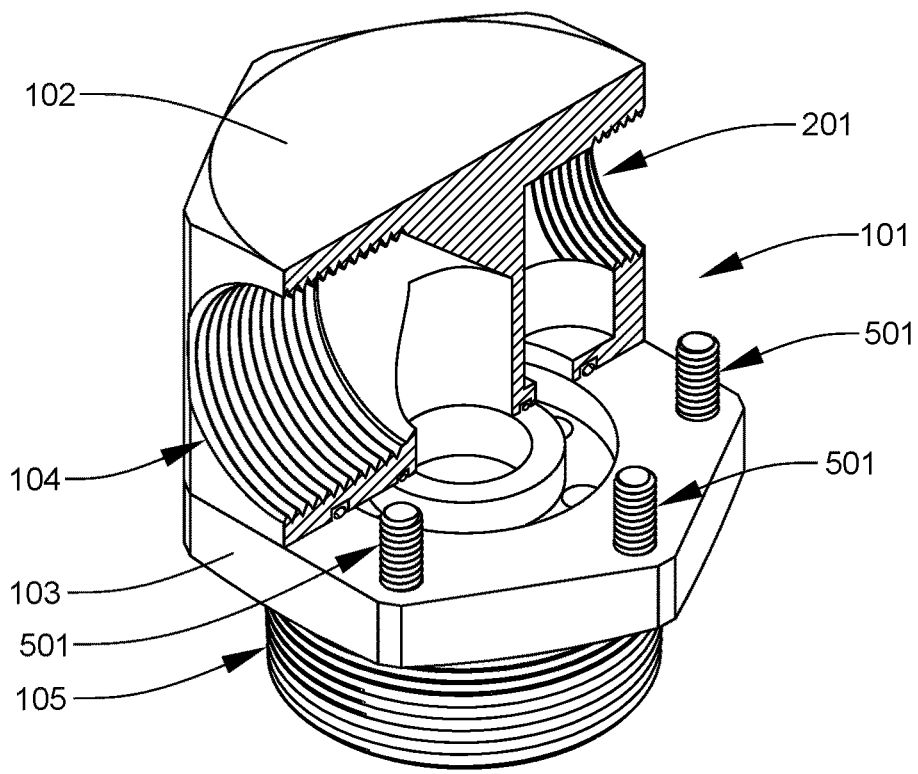
FIG. 5 is a partially-cutaway isometric view of the head, or exterior portion, of the fully-integrated fluid flow control module for top-fill tanks, showing the inlet port, the vent port and two-piece construction thereof.

Referring now to FIG. 5, the inlet/vent head 101 is shown in a partial cross-sectional view, which exposes three of the six allen-head bolts 501 that secure the bottom portion 103 of the inlet/vent head 101 to the top portion 102. It will be noted that a pair of O-ring seals 502 and 503 are employed to prevent fuel leads through the machined surface matings of the bottom and lower portions, 103 and 102, respectively.

Referring now to FIGS. 6 and 7, the fuel level float 111 and the float cage 109 have been removed in order to better show the exterior structure of both the bleed path control assembly 238 and its pivotable component, the lever arm 239, which translates vertical movement of the fuel level float 111 into the vertical position of the bleed control pin 235, which controls flow of fuel through the primary bleed port 230. It will be noted that there is a gap 601 between the lever arm 239 and the upper annular flange 208 of the sleeve 112. As heretofore explained, this gap 601 results in hysteresis between the closing and the opening of the primary bleed port 230.

The sequence resulting in the lifting of the main valve plunger 119 within the main valve control unit 112 and the shut-off of fuel flow into the tank will now be described.

Referring now to FIGS. 2 and 3, the primary bleed port 230 and the secondary bleed port 115 are both open, resulting in insufficient fuel pressure below the main valve plunger 119 to enable the main biasing spring 221 to lift the main valve plunger 119 and seal the valve seat 219 and cut off the flow of fuel into the tank.

Figure 8:
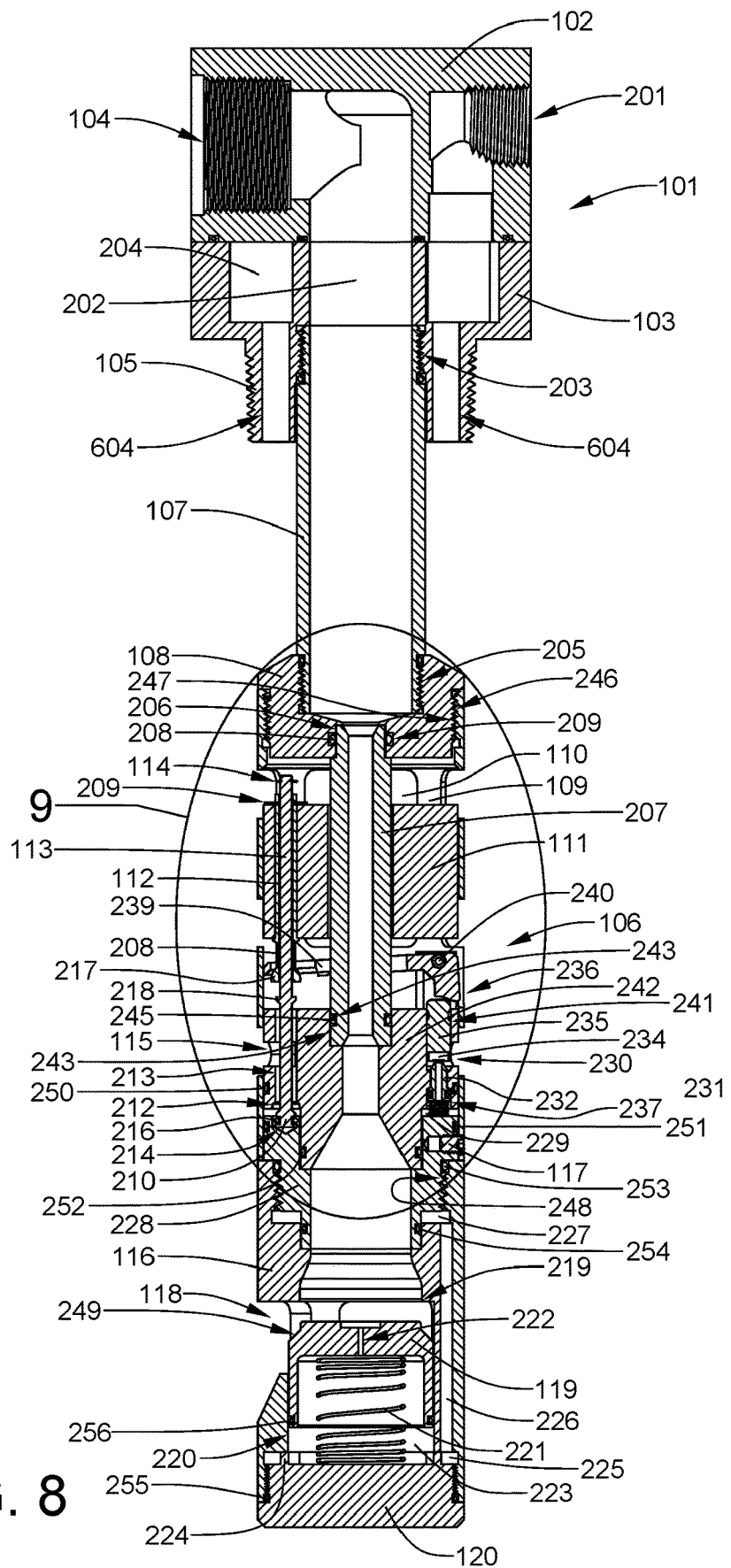
FIG. 8 is a cross-sectional view of the fully-integrated fluid flow control module for top-fill tanks that is identical to FIG. 2, with the exception that the fluid level float has risen an amount sufficient to seal the primary bleed path through the bleed pin.
Figure 9:
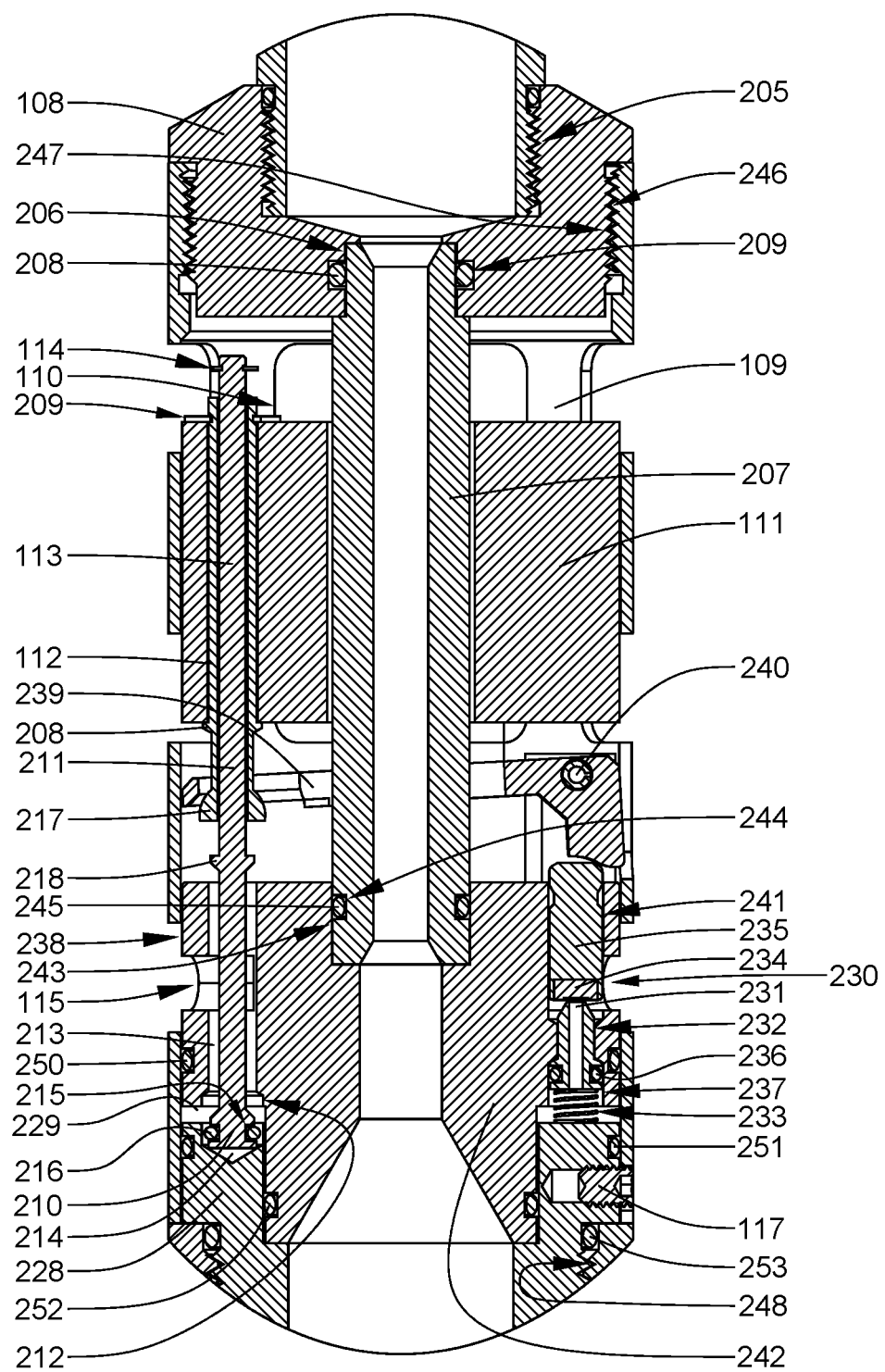
FIG. 9 is an enlarged view of the ellipsoid area 9 of FIG. 8, with 2× magnification.

Referring now to FIGS. 8 and 9, the fuel level float 111 has lifted an amount sufficient to raise the lever arm 239 and depress the bleed control pin 235, thereby sealing the opening through the hollow bleed pin 232 and cutting the flow of bleed fuel through the primary bleed port 230. There is still insufficient fuel pressure below the main valve plunger 119 to enable the main biasing spring 221 to lift the main valve plunger 119 and seal the valve seat 219.

Figure 10:
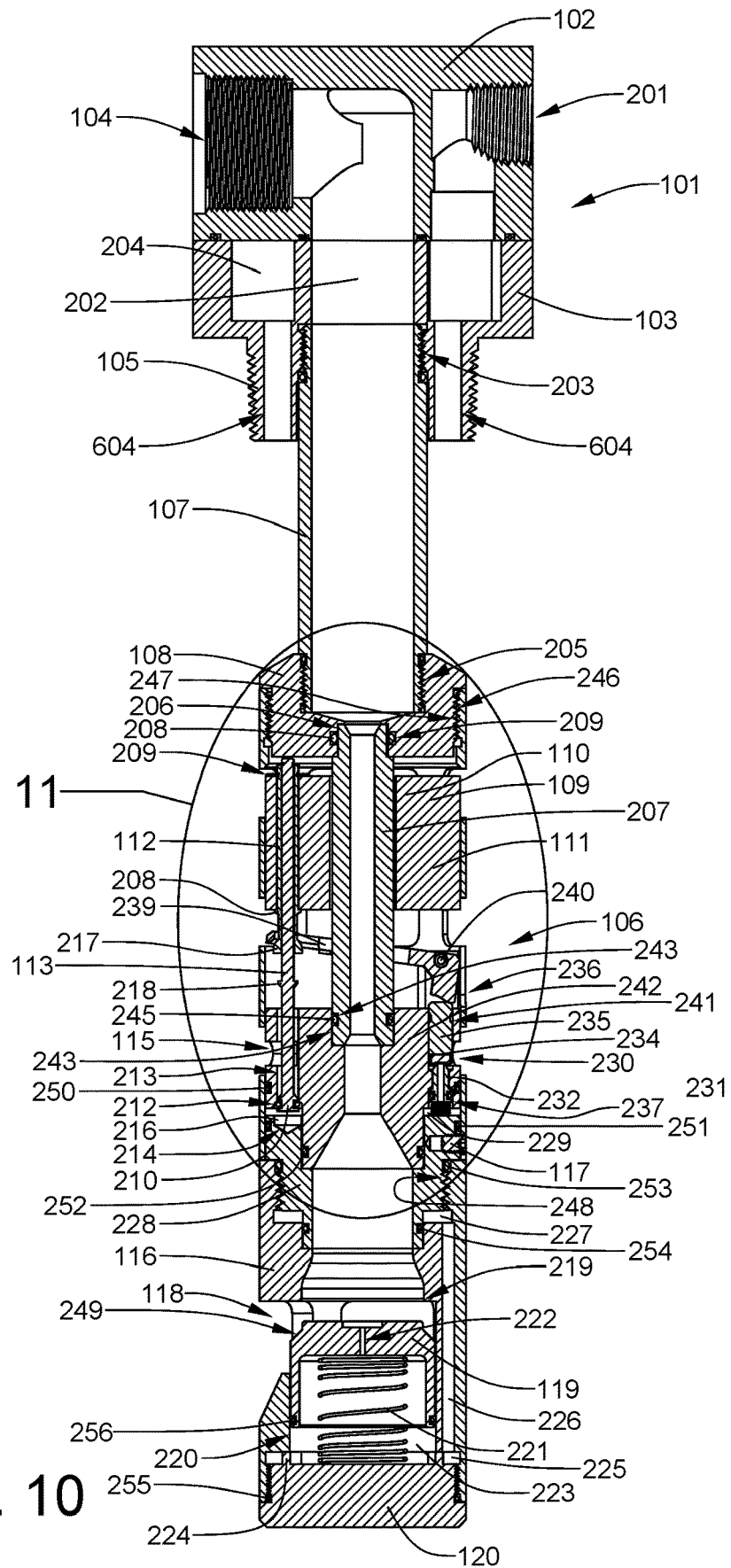
FIG. 10 is a cross-sectional view of the fully-integrated fluid flow control module for top-fill tanks that is identical to FIG. 8, with the exception that the fluid level float has risen an additional amount sufficient to seal both the primary bleed path through the bleed pin and the secondary bleed path through the secondary bleed port.
Figure 11:
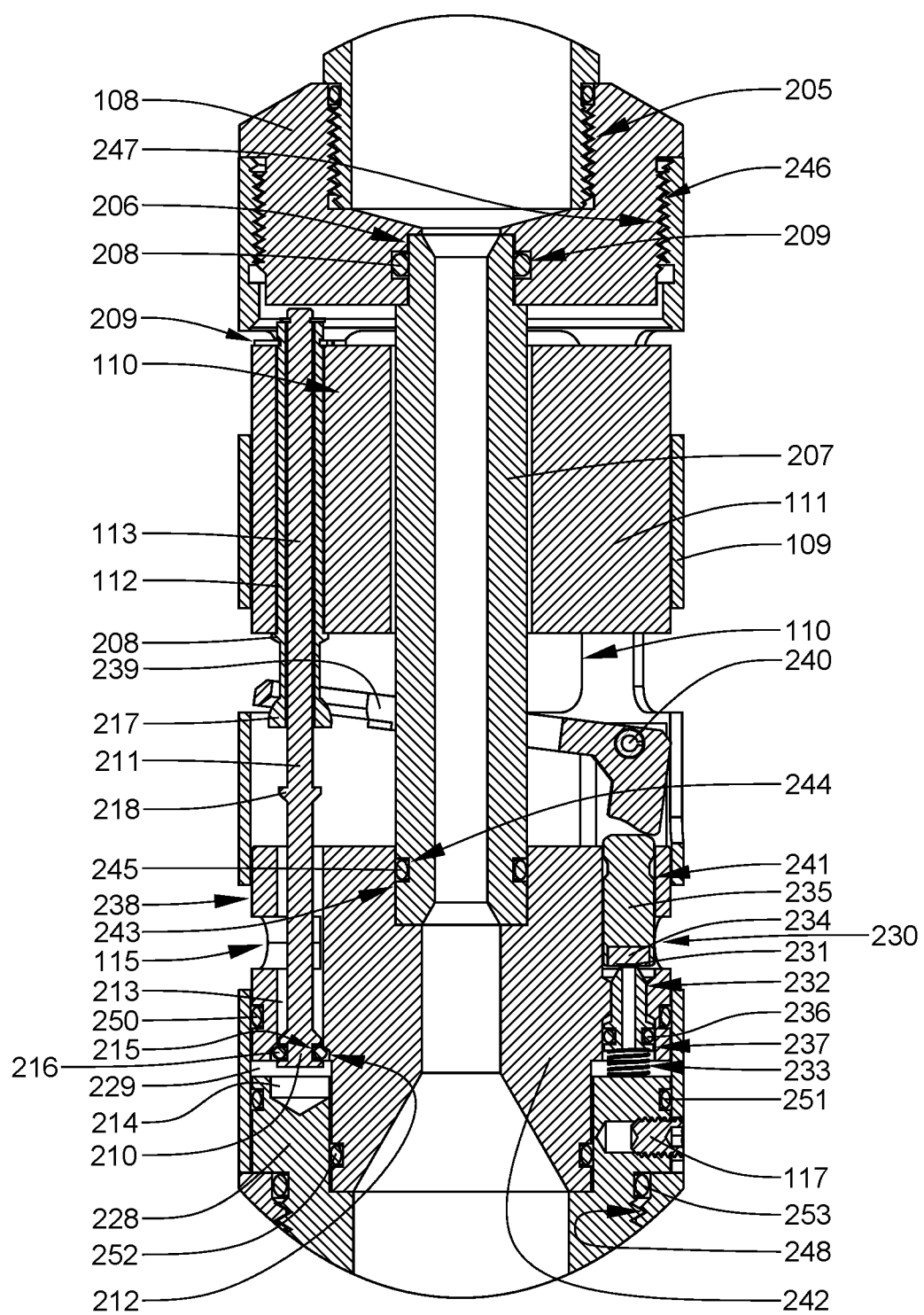
FIG. 11 is an enlarged view of the ellipsoid area 11 of FIG. 10, with 2× magnification.

Referring now to FIGS. 10 and 11, the fuel lovel float 111 has continued to rise so that the top of the sleeve 112 has contacted the rod circlip 114 and lifted the cylindrical rod 113 sufficiently so that the valve plug 210 has blocked the bottom opening 212 of the vertical secondary channel 213. As the bottom opening 212 closes pressure begins to immediately build below the main valve plunger 119. This view shows the main valve plunger 119 just before it rises to seal the valve seat 219.

Figure 12:
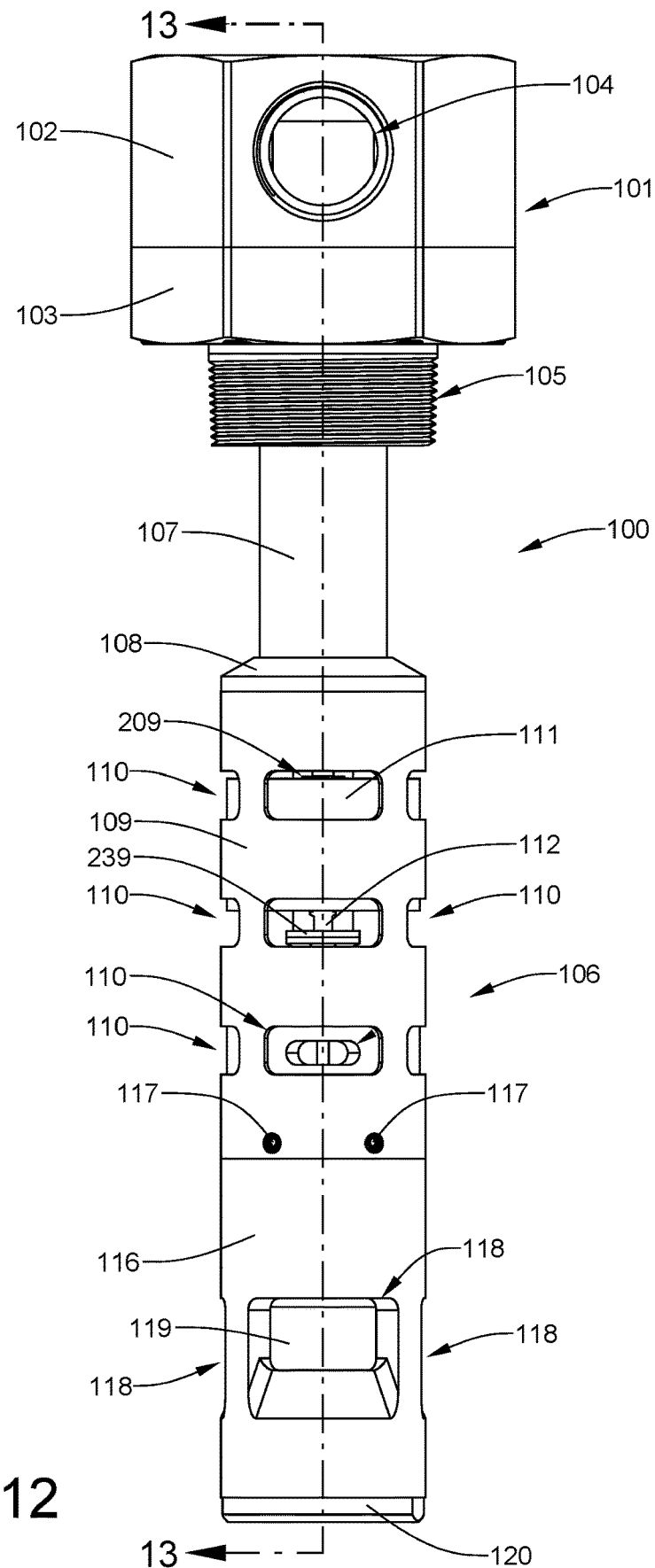
FIG. 12 is a cross-sectional view of the fully-integrated fluid flow control module for top-fill tanks that is identical to FIG. 10, with the exception that, following the closing of both the primary and the secondary bleed paths, the main valve plunger has risen to seal the valve seat, thereby cutting off the flow of fluid into the tank; and the secondary bleed path through the secondary bleed port.

Referring now to FIG. 12, an exterior view of the fully-integrated, flow-control module 100 is shown with the main valve plunger 119 in the closed position.

Figure 13:
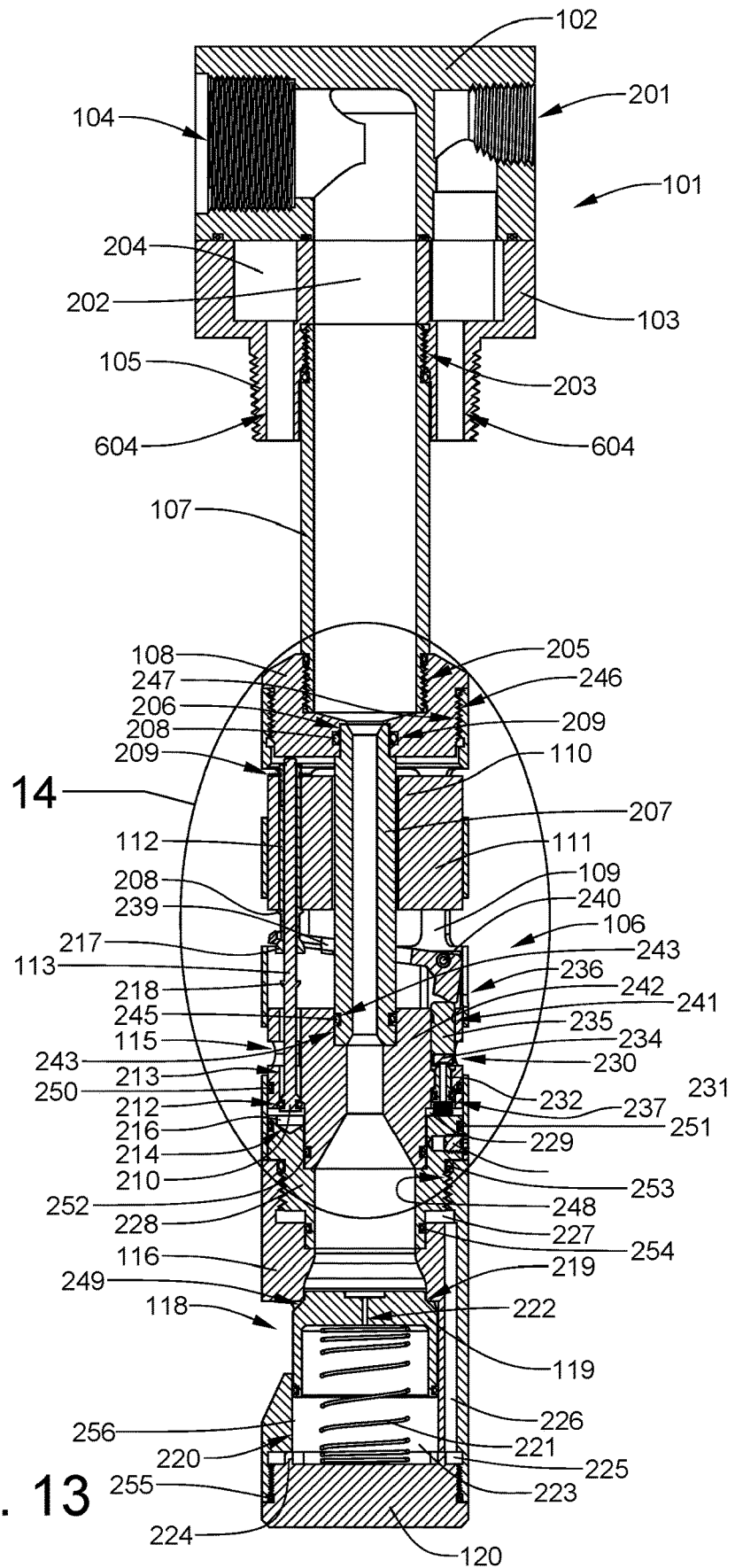
FIG. 13 is an enlarged view of the ellipsoid area 13 of FIG. 12, with 2× magnification.
Figure 14:
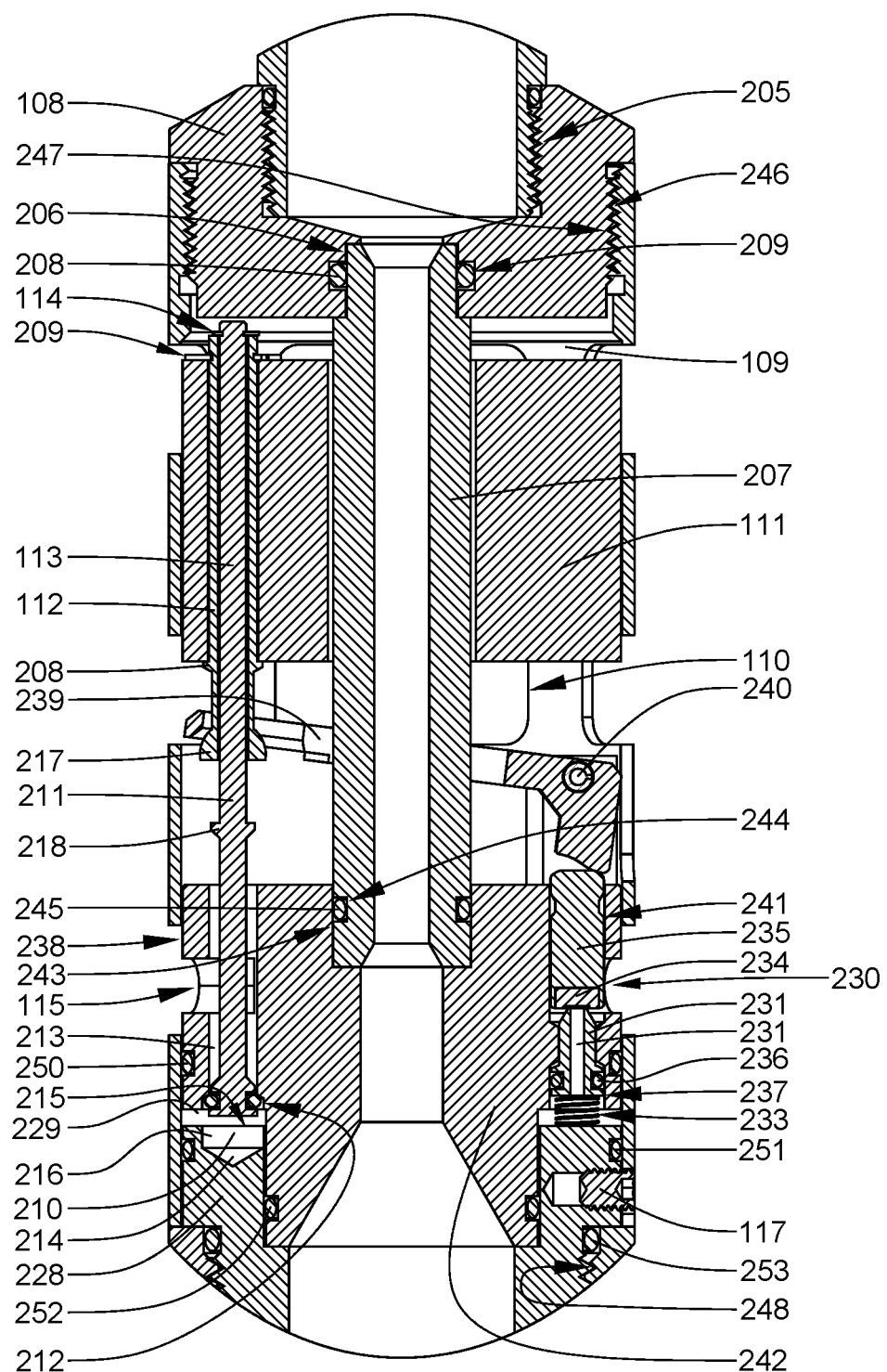
FIG. 14 is an elevational view of the fully-integrated fluid flow control module for top-fill fuel tanks in a valve-closed configuration, and taken from the fluid inlet side thereof.

Referring now to FIGS. 13 and 14, the main valve plunger 119 has risen, immediately following the sealing of the bottom opening 212 with the valve plug 210.

Figure 15:
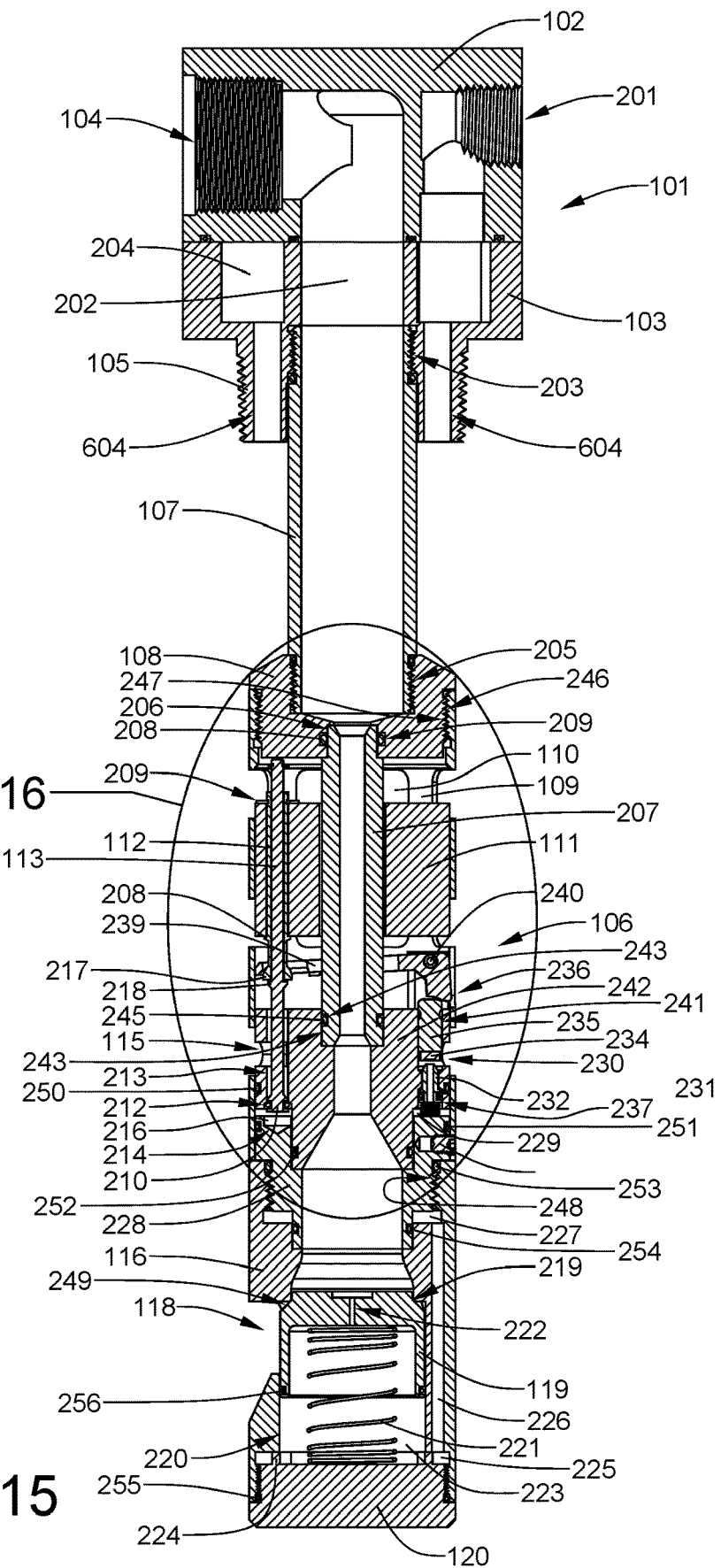
FIG. 15 is a cross-sectional view of the fully-integrated fluid flow control module for top-fill tanks, taken through section line 15-15 of FIG. 14.
Figure 16:
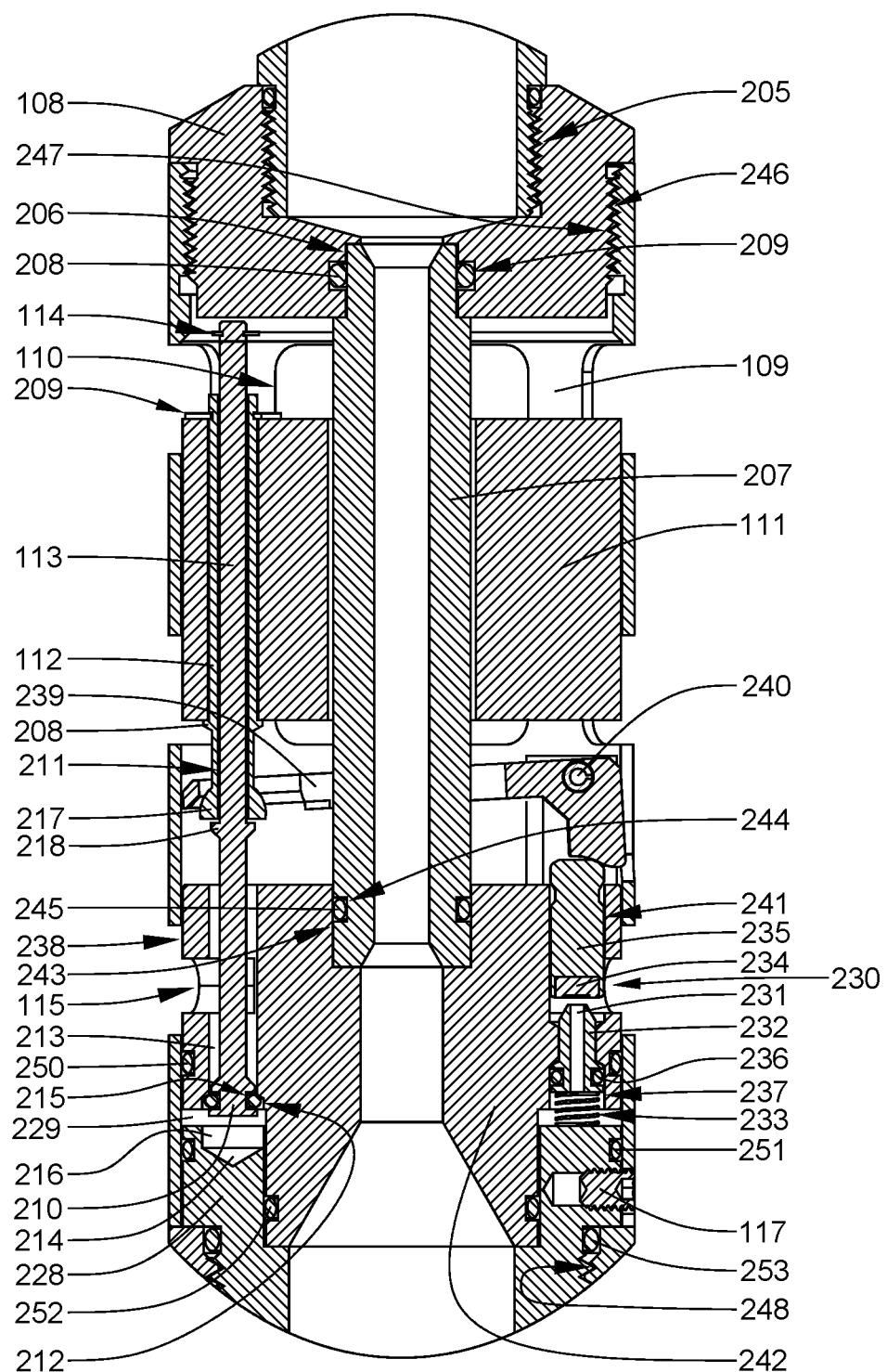
FIG. 16 is an enlarged view of the ellipsoid area 16 of FIG. 15, with 2× magnification.

Referring now to FIGS. 15 and 16, beginning with the closed main valve plunger 119 of FIGS. 13 and 14, the fuel level float 111 has dropped, causing the lever arm 239 to drop an amount sufficient to enable fuel pressure in the bleed path to lift the bleed control pin 235, and thereby open the primary bleed port 230.

Figure 17:
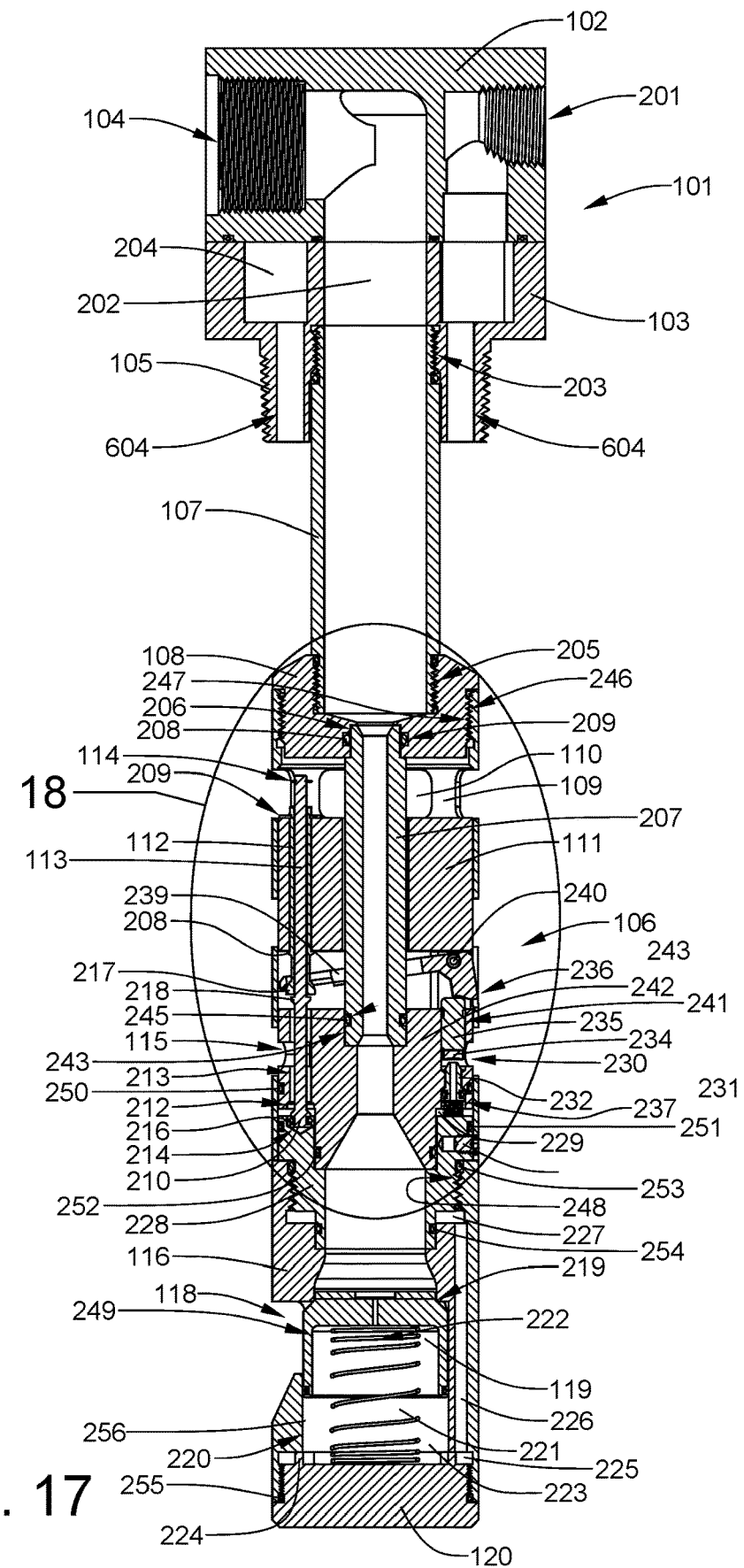
FIG. 17 is a cross-sectional view of the fully-integrated fluid flow control module for top-fill tanks that is identical to FIG. 15, with the exception that the fuel level float has dropped still further—an amount sufficient to also open the secondary primary bleed path through the secondary bleed port, with the main valve plunger still momentarily sealing the valve seat and preventing the flow of fuel into the tank.
Figure 18:
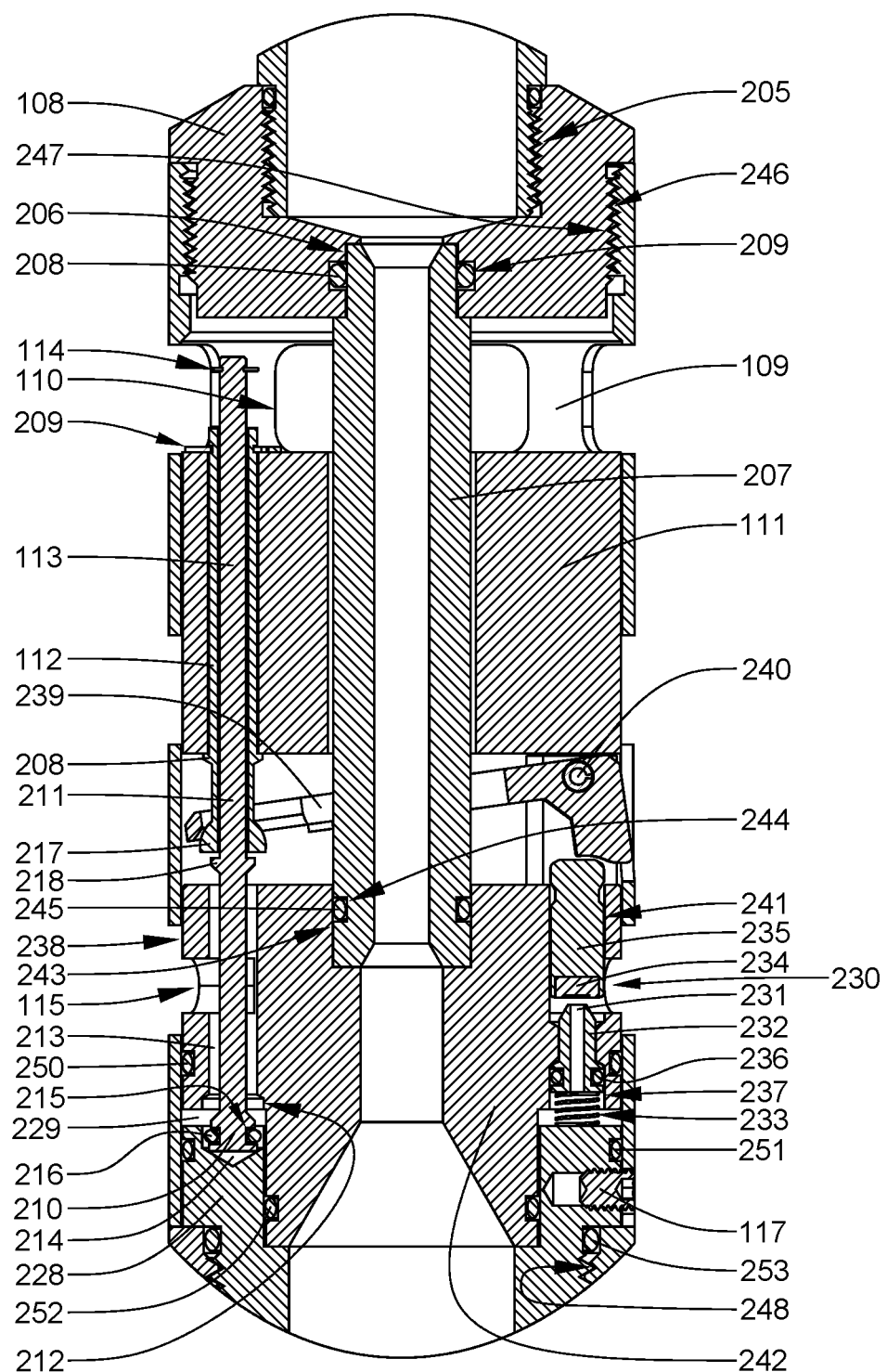
FIG. 18 is an enlarged view of the ellipsoid area 17 of FIG. 16, with 2× magnification.

Referring now to FIGS. 17 and 18, the opening of the primary bleed port 230 reduces fuel pressure in the bleed path so that there is insufficient bleed fuel pressure to hold the cylindrical rod in an elevated position with the valve plug 210 sealing the bottom opening 212 of the secondary bleed port 115. Thus, the valve plug 210 drops, thereby unsealing the bottom opening 212. As the bottom opening 212 is unsealed, pressure immediately drops below the main valve plunger 119. This view shows the main valve plunger 119 just before it drops to unseal the valve seat 219. FIGS. 1, 2 and 3 show the fully-integrated, flow-control module 100 after the main valve plunger 119 has dropped to allow fuel to flow into the tank through the valve seat 219.

Although only a single embodiment of the invention is shown and described herein, it will be obvious to those having ordinary skill in the art that changes and modifications may be made thereto without departing from the scope and the spirit of the invention as hereinafter claimed.

What is claimed is:

1. A fully-integrated, flow-control module for a top-fill fuel tank that is supplied by fuel under pulsating pressure comprises:
an inlet/vent head having a fuel inlet that receives the fuel under pulsating pressure and a vent port that maintains atmospheric pressure in the top-fill fuel tank;
a main valve control unit, in communication with the fuel inlet, that shuts off fuel flow into the top-fill fuel tank when the top-fill fuel tank is full, and automatically opens and allows fuel to enter the top-fill fuel tank when the fuel level drops a certain amount below the full level, said main valve control unit having a valve seat, a valve plunger having a bleed aperture, said valve plunger being upwardly biased by a biasing spring, said bleed aperture diverting a minor portion of incoming fuel to first and second bleed paths that empty into the top-fill fuel tank when the top-fill fuel tank is not full;
a vertically slidable control pin that is upwardly positionable to open the first bleed path and downwardly positionable to close the first bleed path;
a lever arm, operative on the vertically slidable control pin, wherein pivotal movement of of the lever arm controls a vertical position of the control pin; and
a fuel level float, operative on the lever arm, to cause pivotal movement thereof;
a slidable rod that incorporates a secondary bleed port valve plug, said slidable rod being liftable by the fuel level float to close the second bleed path when the top-fill fuel tank is full; and
wherein, when the top-fill fuel tank becomes nearly full, the fuel level float rises, thereby causing the lever arm to pivot and depress the vertically slidable control pin, which seals the first bleed path, thereby increasing fuel pressure beneath the valve plunger an amount insufficient to cause the biasing spring to slide the valve plunger upwardly to fully engage the valve seat; and
wherein, when the top-fill fuel tank becomes full, the slidable rod is lifted so that the secondary bleed port valve plug closes the second bleed path, thereby further increasing fuel pressure beneath the valve plunger an amount sufficient to cause the biasing spring to slide the valve plunger upwardly to fully engage the valve seat and cut off entry of fuel into the top-fill fuel tank.

2. The fully-integrated, flow-control module of claim 1, which further comprises:
a hollow, cylindrical central float guide, through which fuel enters the top-fill fuel tank, said hollow, cylindrical central float guide being surrounded by the fuel level float, which can slide up and down on said hollow, cylindrical central float guide; and
a sleeve secured within the fuel level float, said sleeve having both a cylindrical inner bore, that is parallel to a float guide axis, and a lever-lifting flange at a bottom end thereof, said slidable rod being installed within the cylindrical inner bore.

3. The fully-integrated, flow-control module of claim 2, wherein, in response to upward movement of the fuel level float, the lever-lifting flange lifts the lever arm, which, in turn, depresses the vertically slidable control pin so as to close the first bleed path before the fuel level float engages and lifts the slidable rod to close the second bleed path.

4. A fully-integrated, flow-control module for a top-fill fuel tank that is supplied by fuel under pulsating pressure comprises:
an inlet/vent head having a fuel inlet that receives the fuel under pulsating pressure and a vent port that maintains atmospheric pressure in the top-fill fuel tank;
a fuel level float upwardly and downwardly movable in response to fuel level changes in the top-fill fuel tank; and
a main valve control unit, in communication with the fuel inlet, that shuts off fuel flow into the top-fill fuel tank when the top-fill fuel tank is full, and automatically opens and allows fuel to enter the top-fill fuel tank when the fuel level drops a certain amount below the full level, said main valve control unit having a valve seat, a main valve plunger biased toward a closed position by a biasing spring, said bleed aperture diverting a minor portion of incoming fuel to first and second bleed paths, which open and close sequentially in response to movement of the fuel level float;
wherein in order for the main valve plunger, which controls fuel entry into the top-fill fuel tank, to fully close, both first and second bleed paths must be closed; and
wherein in order for the main valve plunger to fully open, both first and second bleed paths must be open.

5. The fully-integrated, flow-control module of claim 4, wherein during a main valve plunger closing sequence, the first bleed path closes first, followed by closure of the second bleed path.

6. The fully-integrated, flow-control module of claim 4, wherein during a main valve plunger opening sequence, the second bleed path opens first, followed by opening of the first bleed path.

7. The fully-integrated, flow-control module of claim 4, which further comprises:
   a vertically slidable control pin that upwardly positionable to open the first bleed path and downwardly positionable to close the first bleed path;
   a lever arm operative on the vertically slidable control pin, pivotal movement of which controls a vertical position of the control pin, pivotal movement of said lever arm being effected by movement of the fuel level float; and
   a slidable rod that incorporates a secondary bleed port valve plug, said slidable rod being liftable by the fuel level float to close the second bleed path when the top-fill fuel tank is full; and
   wherein, when the top-fill fuel tank becomes nearly full, the fuel level float rises, thereby causing the lever arm to pivot and depress the vertically slidable control pin, which seals the first bleed path, thereby increasing fuel pressure beneath the main valve plunger an amount insufficient to cause the biasing spring to slide the main valve plunger upwardly to fully engage the valve seat; and
   wherein, when the top-fill fuel tank becomes full, the slidable rod is lifted so that the secondary bleed port valve plug closes the second bleed path, thereby further increasing fuel pressure beneath the main valve plunger an amount sufficient to cause the biasing spring to slide the valve plunger upwardly to fully engage the valve seat and cut off entry of fuel into the top-fill fuel tank.

8. The fully-integrated, flow-control module of claim 7, which further comprises:
   a hollow, cylindrical central float guide, through which fuel enters the top-fill fuel tank, said hollow, cylindrial float guide being surrounded by the fuel level float, which can slide up and down on said hollow, cylindrical central float guide; and
   a sleeve secured within the fuel level float, said sleeve having both a cylindrical inner bore, that is parallel to a float guide axis, and a lever-lifting flange at a bottom end thereof, said slidable rod being installed within the cylindrical inner bore.

9. The fully-integrated, flow-control module of claim 8, wherein, in response to upward movement of the fuel level float, the lever-lifting flange lifts the lever arm, which, in turn, depresses the vertically slidable control pin so as to close the first bleed path before the fuel level float engages and lifts the slidable rod to close the second bleed path.

10. A fully-integrated, flow-control module for a top-fill fuel tank that is supplied by fuel under pulsating pressure comprises:
   an inlet/vent head having a fuel inlet that receives the fuel under pulsating pressure and a vent port that maintains atmospheric pressure in the top-fill fuel tank;
   a main valve control unit, in communication with the fuel inlet, that shuts off fuel flow into the top-fill fuel tank when the top-fill fuel tank is full, and automatically opens and allows fuel to enter the top-fill tank when the fuel level drops a certain amount below the full level, said main valve control unit having a valve seat, a valve plunger having a bleed aperture, said valve plunger being upwardly biased by a biasing spring, said bleed aperture diverting a minor portion of incoming fuel to first and second bleed paths that empty into the top-fill fuel tank when the top-fill fuel tank is not full;
   a vertically slidable control pin that upwardly positionable to open the first bleed path and downwardly positionable to close the first bleed path;
   a lever arm, operative on the vertically slidable control pin, pivotal movement of which controls a vertical position of the control pin; and
   a fuel level float, operative on the lever arm, to cause pivotal movement thereof;
   a slidable rod that incorporates a secondary bleed port valve plug, said slidable rod being liftable by the fuel level float to close the second bleed path when the top-fill fuel tank is full;
   a hollow, cylindrical central float guide, through which fuel enters the top-fill fuel tank, said hollow, cylindrical central float guide being surrounded by the fuel level float, which can slide up and down on the float guide; and
   a sleeve secured within the fuel level float, said sleeve having both a cylindrical inner bore, that is parallel to a float guide axis, and a lever-lifting flange at a bottom end thereof, said slidable rod being installed within the cylindrical inner bore; and
   wherein, in response to upward movement of the fuel level float, the lever-lifting flange lifts the lever arm, which, in turn, depresses the vertically slidable control pin so as to close the first bleed path before the fuel level float engages and lifts the slidable rod to close the second bleed path.

\* \* \* \* \*